(12) United States Patent
Jordan et al.

(10) Patent No.: US 12,717,806 B2
(45) Date of Patent: Aug. 25, 2026

(54) SYSTEMS AND METHODS FOR PASSTHROUGH ANALYTICS PAYLOADS USING DEFERRED SCHEMAS

(71) Applicant: Warner Bros. Discovery, Inc., New York, NY (US)

(72) Inventors: Christopher Philip Jordan, Bellevue, WA (US); Jonathan David Lutz, Austin, TX (US)

(73) Assignee: Warner Bros. Discovery, Inc., New York, NY (US)

( * ) Notice: Subject to any disclaimer, the term of this patent is extended or adjusted under 35 U.S.C. 154(b) by 0 days.

(21) Appl. No.: 18/795,628

(22) Filed: Aug. 6, 2024

(65) Prior Publication Data

US 2026/0044524 A1 Feb. 12, 2026

(51) Int. Cl.
*G06F 16/25* (2019.01)
*H04L 67/00* (2022.01)

(52) U.S. Cl.
CPC ............ *G06F 16/258* (2019.01); *H04L 67/34* (2013.01)

(58) Field of Classification Search
CPC ............................... G06F 16/258; H04L 67/34
See application file for complete search history.

(56) References Cited

U.S. PATENT DOCUMENTS 9,787,671 B1* 10/2017 Bogrett ................... H04L 67/60
2011/0289479 A1* 11/2011 Pletter ..................... G06F 16/27 717/122
2019/0246281 A1* 8/2019 Ziskind ............... H04W 12/088
2022/0027417 A1* 1/2022 Katz ................. G06F 16/90335
2024/0195675 A1* 6/2024 Thomas ................ H04L 41/069
2025/0131372 A1* 4/2025 Bestfleisch ......... G06F 16/2365
2025/0252086 A1* 8/2025 Pore ...................... G06F 16/212

OTHER PUBLICATIONS

S. Khan, E. Rydow, S. Etemaditajbakhsh, K. Adamek and W. Armour, "Web Performance Evaluation of High Volume Streaming Data Visualization," in IEEE Access, vol. 11, pp. 15623-15636, 2023. (Year: 2023).*

* cited by examiner

*Primary Examiner* — Cheyne D Ly
(74) *Attorney, Agent, or Firm* — Bookoff McAndrews, PLLC

(57) ABSTRACT

Systems and methods are disclosed for a passthrough analytics payload system. One method comprises receiving a resource request from a user device, in response to receiving the resource request, retrieving and/or computing one or more analytics payloads, serializing the one or more analytics payloads based on one or more schemas, sending a resource response to the user device, wherein the resource response includes the one or more analytics payloads and one or more resources, receiving an analytics request from the user device, wherein the analytics request includes the one or more analytics payloads and specific user device analytics information, receiving the one or more schemas for the one or more analytics payloads, deserializing the one or more analytics payloads based on the one or more schemas to determine user analytics data, and storing the user analytics data in one or more data stores.

20 Claims, 4 Drawing Sheets

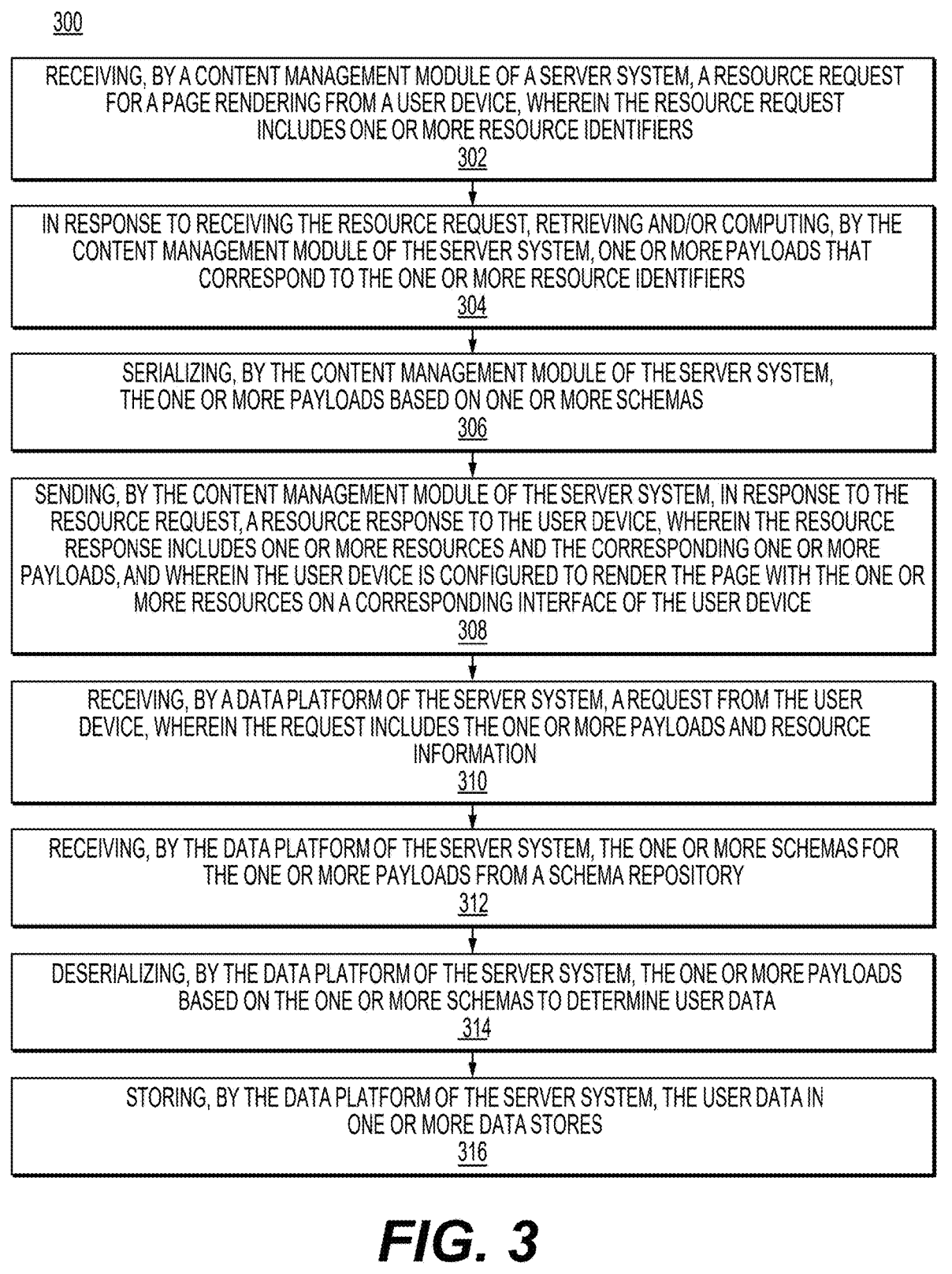

300

RECEIVING, BY A CONTENT MANAGEMENT MODULE OF A SERVER SYSTEM, A RESOURCE REQUEST FOR A PAGE RENDERING FROM A USER DEVICE, WHEREIN THE RESOURCE REQUEST INCLUDES ONE OR MORE RESOURCE IDENTIFIERS
302

IN RESPONSE TO RECEIVING THE RESOURCE REQUEST, RETRIEVING AND/OR COMPUTING, BY THE CONTENT MANAGEMENT MODULE OF THE SERVER SYSTEM, ONE OR MORE PAYLOADS THAT CORRESPOND TO THE ONE OR MORE RESOURCE IDENTIFIERS
304

SERIALIZING, BY THE CONTENT MANAGEMENT MODULE OF THE SERVER SYSTEM, THE ONE OR MORE PAYLOADS BASED ON ONE OR MORE SCHEMAS
306

SENDING, BY THE CONTENT MANAGEMENT MODULE OF THE SERVER SYSTEM, IN RESPONSE TO THE RESOURCE REQUEST, A RESOURCE RESPONSE TO THE USER DEVICE, WHEREIN THE RESOURCE RESPONSE INCLUDES ONE OR MORE RESOURCES AND THE CORRESPONDING ONE OR MORE PAYLOADS, AND WHEREIN THE USER DEVICE IS CONFIGURED TO RENDER THE PAGE WITH THE ONE OR MORE RESOURCES ON A CORRESPONDING INTERFACE OF THE USER DEVICE
308

RECEIVING, BY A DATA PLATFORM OF THE SERVER SYSTEM, A REQUEST FROM THE USER DEVICE, WHEREIN THE REQUEST INCLUDES THE ONE OR MORE PAYLOADS AND RESOURCE INFORMATION
310

RECEIVING, BY THE DATA PLATFORM OF THE SERVER SYSTEM, THE ONE OR MORE SCHEMAS FOR THE ONE OR MORE PAYLOADS FROM A SCHEMA REPOSITORY
312

DESERIALIZING, BY THE DATA PLATFORM OF THE SERVER SYSTEM, THE ONE OR MORE PAYLOADS BASED ON THE ONE OR MORE SCHEMAS TO DETERMINE USER DATA
314

STORING, BY THE DATA PLATFORM OF THE SERVER SYSTEM, THE USER DATA IN ONE OR MORE DATA STORES
316

FIG. 3

SYSTEMS AND METHODS FOR PASSTHROUGH ANALYTICS PAYLOADS USING DEFERRED SCHEMAS

TECHNICAL FIELD

The present disclosure relates to passthrough analytics payloads and, more particularly, to systems and methods for passthrough analytics payloads using deferred schemas.

BACKGROUND

Server systems may utilize client device event data for many purposes, including observability (e.g., application and player health), analytics (e.g., business data products), and/or machine-learning (customer experience data products). However, client devices may bear the burden of being responsible for sending the client device event data (e.g., user behavioral event data) to one or more server systems, where the server systems may process the event data for the purposes described above. Additionally, the client device event data may utilize schemas, where both client devices and server systems, which are in communication with the client devices, may need to be aware of the schemas in order to transmit and analyze the client device event data.

Conventional approaches may include client devices gathering and deriving some of the values for the client device event data. However, such approaches may result in multiple problems and inefficiencies. For example, conventional approaches may include duplicated logic across client platforms for deriving values used in constructing the event data. Additionally, conventional approaches may result in an increased maintenance overhead. For example, changes in derived attribute logic may need to be replicated across all client platforms. Additionally, the conventional approaches may also include a risk of inconsistencies in how event property values are computed across client platforms. Such conventional approaches may also result in a need for increased coordination and development time to extend client event schemas, which impact multiple components across a software stack. As a result, a need exists to reduce the burden of client devices gathering and deriving client device event data.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

Embodiments of the present disclosure include systems and methods for a passthrough payload system using deferred schemas.

According to certain embodiments, computer-implemented methods are disclosed for a passthrough payload system. One method may include receiving, by a content management module of a server system, a resource request for a page rendering from a user device, wherein the resource request includes one or more resource identifiers. The method may further include, in response to receiving the resource request, retrieving and/or computing, by the content management module of the server system, one or more payloads that correspond to the one or more resource identifiers. The method may further include serializing, by the content management module of the server system, the one or more payloads based on one or more schemas. The method may further include sending, by the content management module of the server system, in response to the resource request, a resource response to the user device, wherein the resource response includes one or more resources and the corresponding one or more payloads, and wherein the user device is configured to render the page with the one or more resources on a corresponding interface of the user device. The method may further include receiving, by a data platform of the server system, a request from the user device, wherein the request includes the one or more payloads and resource information. The method may further include receiving, by the data platform of the server system, the one or more schemas for the one or more payloads from a schema repository. The method may further include deserializing, by the data platform of the server system, the one or more payloads based on the one or more schemas to determine user data. The method may further include storing, by the data platform of the server system, the user data in one or more data stores.

According to certain embodiments, a computer system for a passthrough payload system is disclosed. The computer system may comprise a memory having processor-readable instructions stored therein, and one or more processors configured to access the memory and execute the processor-readable instructions, which when executed by the one or more processors configures the one or more processors to perform a plurality of functions. The functions may include receiving, by a content management module of a server system, a resource request for a page rendering from a user device, wherein the resource request includes one or more resource identifiers. The functions may further include, in response to receiving the resource request, retrieving and/or computing, by the content management module of the server system, one or more payloads that correspond to the one or more resource identifiers. The functions may further include serializing, by the content management module of the server system, the one or more payloads based on one or more schemas. The functions may further include sending, by the content management module of the server system, in response to the resource request, a resource response to the user device, wherein the resource response includes one or more resources and the corresponding one or more payloads, and wherein the user device is configured to render the page with the one or more resources on a corresponding interface of the user device. The functions may further include receiving, by a data platform of the server system, a request from the user device, wherein the request includes the one or more payloads and resource information. The functions may further include receiving, by the data platform of the server system, the one or more schemas for the one or more payloads from a schema repository. The functions may further include deserializing, by the data platform of the server system, the one or more payloads based on the one or more schemas to determine user data. The functions may further include storing, by the data platform of the server system, the user data in one or more data stores.

According to certain embodiments, a non-transitory computer-readable medium containing instructions for a passthrough payload system is disclosed. The instructions may include receiving, by a content management module of a server system, a resource request for a page rendering from a user device, wherein the resource request includes one or more resource identifiers. The instructions may further include, in response to receiving the resource request, retrieving and/or computing, by the content management module of the server system, one or more payloads that correspond to the one or more resource identifiers. The instructions may further include serializing, by the content management module of the server system, the one or more payloads based on one or more schemas. The instructions may further include sending, by the content management module of the server system, in response to the resource request, a resource response to the user device, wherein the resource response includes one or more resources and the corresponding one or more payloads, and wherein the user device is configured to render the page with the one or more resources on a corresponding interface of the user device. The instructions may further include receiving, by a data platform of the server system, a request from the user device, wherein the request includes the one or more payloads and resource information. The instructions may further include receiving, by the data platform of the server system, the one or more schemas for the one or more payloads from a schema repository. The instructions may further include deserializing, by the data platform of the server system, the one or more payloads based on the one or more schemas to determine user data. The instructions may further include storing, by the data platform of the server system, the user data in one or more data stores.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts a schematic diagram of an exemplary method of executing a passthrough analytics payload system, according to one or more embodiments.

DETAILED DESCRIPTION OF EMBODIMENTS

Figure 1:
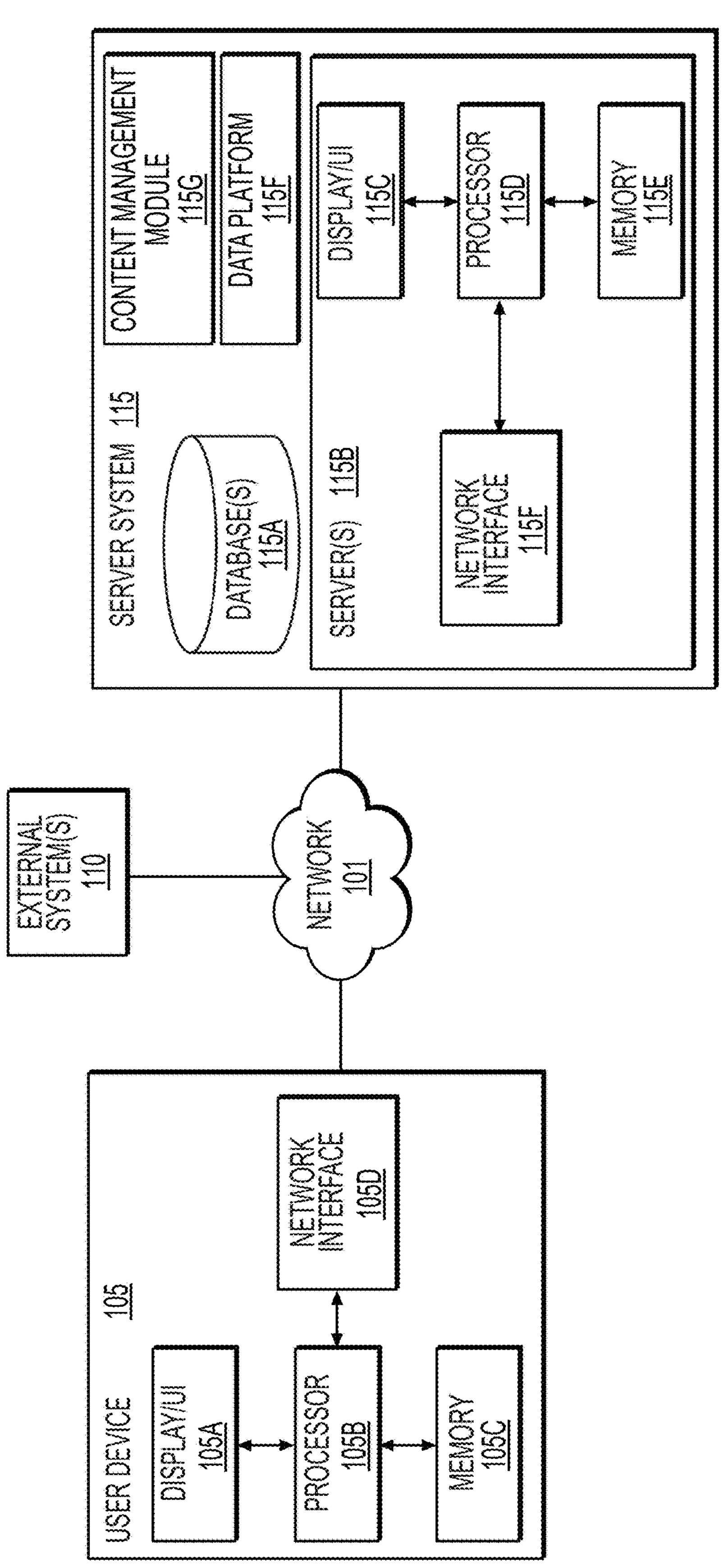
FIG. 1 depicts a schematic diagram illustrating an example networked computing environment implementing methods and systems of this disclosure, according to one or more embodiments.

According to certain aspects of the disclosure, methods and systems are disclosed for passthrough analytics payloads using deferred schemas. Conventional techniques may not be suitable at least because conventional techniques, among other things, place the burden of sending client device event data on client devices, resulting in many inefficiencies and potential errors. Accordingly, improvements in technology relating to reducing the burden of client devices gathering and deriving client device event data are needed.

Server systems may utilize client device event data for many purposes, including observability (e.g., application and player health), analytics (e.g., business data products), and/or machine-learning (customer experience data products). However, client devices may bear the burden of being responsible for sending the client device event data (e.g., user behavioral event data) to one or more server systems, where the server systems may process the event data for the purposes described above. Additionally, the client device event data may utilize schemas, where both client devices and server systems, which are in communication with the client devices, may need to be aware of the schemas in order to transmit and analyze the client device event data.

Conventional approaches may include client devices gathering and deriving some of the values for the client device event data. However, such approaches may result in multiple problems and inefficiencies. For example, conventional approaches may include duplicated logic across client platforms for deriving values used in constructing the event data. Additionally, conventional approaches may result in an increased maintenance overhead. For example, changes in derived attribute logic may need to be replicated across all platforms (e.g., client platforms and server-side platforms). Additionally, the conventional approaches may also include a risk of inconsistencies in how event property values are computed across the platforms. The conventional approaches may also result in a need for increased coordination and development time to extend client event schemas, which impact multiple components, across a software stack. As a result, a need exists to reduce the burden of client devices gathering and deriving client device event data.

Advantages of such a system may include creating a single source for generating the analytics payload. For example, the content management module may create the analytics payload, which may result in ensuring the consistency of the analytics payload across all client device platforms. Additional advantages of the system may include decoupling the client device from backend domain models by applying a deferred schema to the analytics payload, where the deferred schema may be enforced by publishing services and/or the data platform, but the deferred schema may remain unknown to the client device. This may decouple client devices from backend domain models by placing domain-derived or domain-specific information inside a deferred schema payload that is constructed server-side. The schema may be known to the services generating the payloads and the data platform that may consume the payloads, but not the client device. As a result, additional advantages of the system may include reducing data inconsistency across client devices, as the analytics values may be constructed by a single server-side implementation, instead of several client-side implementations. Additional advantages may include reducing errors by updating the server-side devices without updating the client device. Such an advantage may reduce errors that occur when updating multiple devices. Additional advantages may include simplifying the process for modifying the contents of the analytics payload. For example, instead of having to make the modification N times, where N corresponds to the number of client code bases, the change can be made once on the server side. Moreover, not having to change the client code may also provide for the avoidance of being subjected to third party code certification processes and turnaround time.

The systems and methods disclosed herein describe a passthrough analytics payload system. The systems and methods may include receiving, by a content management module of a server system, a resource request for a page rendering from a user device, wherein the resource request includes one or more resource identifiers. The systems and methods may include, in response to receiving the resource request, retrieving and/or computing, by the content management module of the server system, one or more analytics payloads that correspond to the one or more resource identifiers. The determining may include serializing, by the content management module of the server system, the one or more analytics payloads based on one or more schemas. The systems and methods may include sending, by the content management module of the server system, in response to the resource request, a resource response to the user device, wherein the resource response includes one or more resources and the corresponding one or more analytics payloads, and wherein the user device is configured to render the page with the one or more resources on a corresponding interface of the user device. The systems and methods may include receiving, by a data platform of the server system, an analytics request from the user device, wherein the analytics request includes the one or more analytics payloads and resource analytics information. The systems and methods may include receiving, by the data platform of the server system, the one or more schemas for the one or more analytics payloads from a schema repository. The systems and methods may include deserializing, by the data platform of the server system, the one or more analytics payloads based on the one or more schemas to determine user analytics data. The systems and methods may include storing, by the data platform of the server system, the user analytics data in one or more data stores.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of +10% in a stated value. The term "exemplary" is used in the sense of "example" rather than "ideal." As used herein, the singular forms "a," "an," and "the" include plural reference unless the context dictates otherwise.

As used herein, a "machine-learning model" or a "deep learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model/system is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine-learning techniques, such as linear regression, logistical regression, random forest, gradient boosted machine (GBM), decision tree, gradient boosting in a decision tree, deep learning, and/or a deep neural network. Supervised and/or unsupervised training may be employed. For example, supervised learning may include providing training data and classifications corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

Exemplary Environment

FIG. 1 depicts an exemplary environment 100 that may be utilized with techniques presented herein. One or more user device(s) 105, one or more external system(s) 110, and one or more server system(s) 115 may communicate across a network 101. As will be discussed in further detail below, one or more server system(s) 115 may communicate with one or more of the other components of the environment 100 across network 101. The one or more user device(s) 105 (e.g., client devices) may be associated with a user.

In some embodiments, the components of the environment 100 are associated with a common entity. In some embodiments, one or more of the components of the environment are associated with a different entity than another. The systems and devices of the environment 100 may communicate in any arrangement.

The user device 105 (e.g., client device) may be configured to enable the user to access and/or interact with other systems in the environment 100. For example, the user device 105 may be a computer system such as, for example, a desktop computer, a mobile device, a tablet, etc. In some embodiments, the user device 105 may include one or more electronic application(s), e.g., a program, plugin, browser extension, etc., installed on a memory of the user device 105.

The user device 105 may include a display/user interface (UI) 105A, a processor 105B, a memory 105C, and/or a network interface 105D. The user device 105 may execute, by the processor 105B, an operating system (O/S) and at least one electronic application (each stored in memory 105C). The electronic application may be a desktop program, a browser program, a web client, or a mobile application program (which may also be a browser program in a mobile O/S), an applicant specific program, system control software, system monitoring software, software development tools, or the like. For example, environment 100 may extend information on a web client that may be accessed through a web browser. In some embodiments, the electronic application(s) may be associated with one or more of the other components in the environment 100. The application may manage the memory 105C, such as a database, to transmit streaming data to network 101. The display/UI 105A may be a touch screen or a display with other input systems (e.g., mouse, keyboard, etc.) so that the user(s) may interact with the application and/or the O/S. The network interface 105D may be a TCP/IP network interface for, e.g., Ethernet or wireless communications with the network 101. The processor 105B, while executing the application, may generate data and/or receive user inputs from the display/UI 105A and/or receive/transmit messages to the server system 115, and may further perform one or more operations prior to providing an output to the network 101.

External systems 110 may be, for example, one or more third party and/or auxiliary systems that integrate and/or communicate with the server system 115 in performing various query analysis tasks. External systems 110 may be in communication with other device(s) or system(s) in the environment 100 over the one or more networks 101. For example, external systems 110 may communicate with the server system 115 via API (application programming interface) access over the one or more networks 101, and also communicate with the user device(s) 105 via web browser access over the one or more networks 101.

In various embodiments, the network 101 may be a wide area network ("WAN"), a local area network ("LAN"), a personal area network ("PAN"), or the like. In some embodiments, network 101 includes the Internet, and information and data provided between various systems occurs online. "Online" may mean connecting to or accessing source data or information from a location remote from other devices or networks coupled to the Internet. Alternatively, "online" may refer to connecting or accessing a network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

The server system 115 may include an electronic data system, e.g., a computer-readable memory such as a hard drive, flash drive, disk, etc. In some embodiments, the server system 115 includes and/or interacts with an application programming interface for exchanging data to other systems, e.g., one or more of the other components of the environment.

The server system 115 may include a database 115A and at least one server 115B. The server system 115 may be a computer, system of computers (e.g., rack server(s)), and/or or a cloud service computer system. The server system may store or have access to database 115A (e.g., hosted on a third party server or in memory 115E). The server(s) may include a display/UI 115C, a processor 115D, a memory 115E, and/or a network interface 115F. The display/UI 115C may be a touch screen or a display with other input systems (e.g., mouse, keyboard, etc.) for an operator of the server 115B to control the functions of the server 115B. The server system 115 may execute, by the processor 115D, an operating system (O/S) and at least one instance of a servlet program (each stored in memory 115E). The server system 115 may include a content management module 115G of a content management service and a data platform 115F. The content management module 115G may correspond to a publishing service that may store, implement, and/or update user experience context data that corresponds to one or more mobile applications. The user experience context data may include display information and/or functionality information that corresponds to the mobile application. The data platform 115F may ingest, pre-process, and/or process client events (e.g., client behavior events).

The server system 115 may generate, store, train, or use one or more machine-learning models. The server system 115 may include a deep learning model and/or instructions associated with the deep learning model, e.g., instructions for generating a deep learning model, training the deep learning model, using the deep learning model, etc. The server system 115 may also include training data.

In some embodiments, a system or device other than the server system 115 is used to generate and/or train the deep learning model. For example, such a system may include instructions for generating the deep learning model, the training data and ground truth, and/or instructions for training the deep learning model. A resulting trained deep learning model may then be provided to the server system 115.

Generally, a deep learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model.

Although depicted as separate components in FIG. 1, it should be understood that a component or portion of a component in the environment 100 may, in some embodiments, be integrated with or incorporated into one or more other components. For example, a portion of the display 115C may be integrated into the user device 105 or the like. In some embodiments, operations or aspects of one or more of the components discussed above may be distributed amongst one or more other components. Any suitable arrangement and/or integration of the various systems and devices of the environment 100 may be used.

In these methods, various acts may be described as performed or executed by a component from FIG. 1, such as the server system 115, the user device 105, or components thereof. However, it should be understood that in various embodiments, various components of the environment 100 discussed above may execute instructions or perform acts including the acts discussed above and below. An act performed by a device may be considered to be performed by a processor, actuator, or the like associated with that device. Further, it should be understood that in various embodiments, various steps may be added, omitted, and/or rearranged in any suitable manner.

Figure 2:
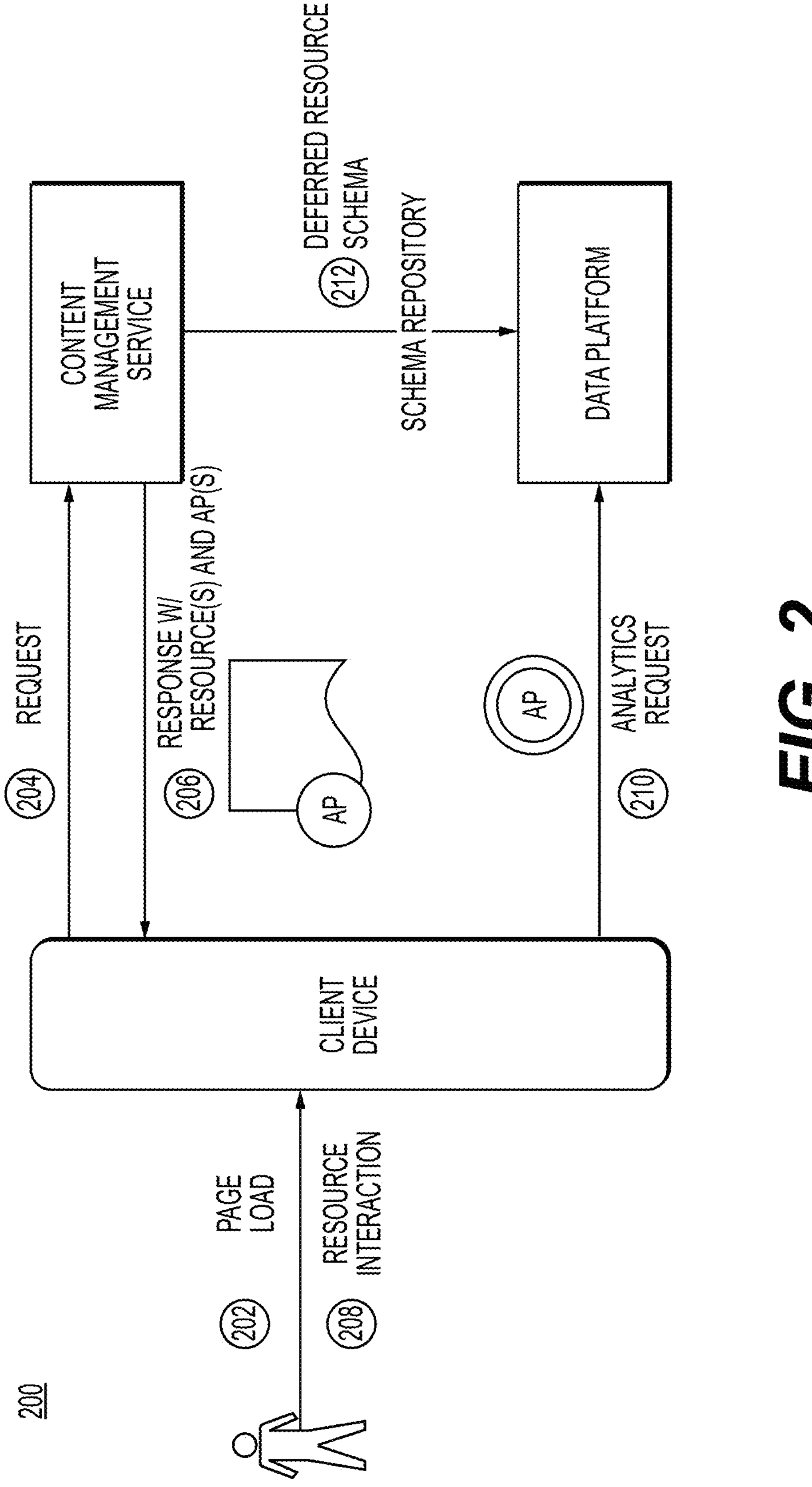
FIG. 2 depicts a conceptual flow diagram of an exemplary method of utilizing the disclosed passthrough analytics payload system, according to one or more embodiments.

In general, any process or operation discussed in this disclosure that is understood to be computer-implementable, such as the processes illustrated in FIGS. 2-3, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Exemplary Flow Diagram for Passthrough Analytics Payload System

FIG. 2 depicts a flow diagram of an exemplary method 200 utilizing the passthrough analytics payload system, according to one or more embodiments. Notably, method 200 may be performed by one or more processors of a server (e.g., server system 115) that is in communication with one or more user devices (e.g., user device(s) 105) and other external system(s) (e.g., external system(s) 110) via a network (e.g., network 101). However, it should be noted that method 200 may be performed by any one or more of the server, one or more user devices, or other external systems. Exemplary method 200 may be executed on one or more components of FIG. 1 or 4.

At step 202, the user may initiate or perform an action via the user's client device that may request a resource from a content management service. For example, the client device (e.g., user device 105) may output a user interface of a mobile application on a display of the client device. A user may interact with the mobile application via the user interface, where the interactions (e.g., actions) may result in the client device sending one or more resource requests to the content management service (e.g., content management module 115G). Example interactions may include a page tab selection, a video tile selection, a selection of a tab in a hero image, navigating a menu, clicking on the user interface, and the like. For example, the user may select a graphic on the client device to initiate a "page load" to open a new page of the mobile application, where the selection may trigger the client device to create a new page request. The new page request may include a request for one or more resources that correspond to the new page. The resources may include collections of content that may be used to populate components of the user interface. For example, the resources may correspond to a set of video collections. Additionally, or alternatively, the resources may correspond to a collection of hero content that may be used to populate a hero panel and its tabs on a home page of the user interface.

At step 204, the client device may send the request to the content management service. The request may include one or more specified resources that correspond to the action performed by the user and/or the page load requested at the client device. For example, the request may include a page load request for a new page.

At step 206, the content management service may send a response back to the client device, where the response may include the one or more resources and the corresponding one or more analytics payloads ("AP"), possibly alongside others. The content management service may communicate with other internal systems and/or external systems. For example, the content management service may communicate with a recommendations service in order to retrieve personalized content for a user. The response may include an API data model for resources that may be augmented with a dedicated payload for analytics (or a set of payloads for analytics) and machine-learning supported by a data platform (e.g., data platform 115F).

The purpose of the response may include conveying data and analytics information related to the resource to the data platform via the client device. Each of the resources in the response may include an analytics payload (AP) that may include a collection of properties that may support business data and/or user (e.g., customer) experience data. The analytics payload may include an identifier and a type. The identifier may correspond to a unique identifier of the object that may be used for hydration on the backend. The type may correspond to the type of analytics payload, where the type may be used to identify which schema to use for deserializing the payload. The type may be used to specify the resource for an analytics classification. For example, the type of resource may indicate the types of user interactions with the resources. Resources may be grouped based on a subtype, where the subtype may indicate how a user device should render the resources in the subtype on the user interface. The subtype may also indicate whether the user may engage with the grouped resources. The analytics classification may correspond to the user interactions of the particular type (or subtype) of resources. In some embodiments, service owners may define the type and corresponding schema for the payloads that the service owners may want to pass to the data platform. The analytics payload may be strongly-typed (e.g., constrained by a schema) from the perspective of the content management service and/or the data platform. The schema may correspond to the analytics payload type, where the different payload types may have different schemas. Additionally, or alternatively, custom attributes may be added to an analytics payload by one or more services.

The content management service may serialize each analytics payload with one or more schemas. The schemas may be referred to as "deferred schemas," where the client device may not necessarily know the schema but the content management service and a data platform may be aware of the schema. Each analytics payload may include a type, where the type may correspond to a specific schema for the analytics payload. Upon receiving the response, the client device may render the resources into a corresponding user interface. When rendering the resources on the user interface, the client device may treat each of the analytics payload opaquely, where the client device may leave the analytics payload unread and/or untouched, where the client device may refrain from modifying the analytics payload.

An object may represent the analytics payload, where the analytics payload may be opaque from the perspective of client device. For example, in response to the page load request, the content management service may include a collection object in the response. The collection object may include an analytics payload that may include instrumentation information regarding the collection. Additionally, a scoped object may include the analytics payload, where if properties are common across domains (e.g., the server system and the client device), then such properties (e.g., "id," "type") may be placed at a top level of the object. If the properties are specific to a domain, then such properties (e.g., "sessionld," "pinned") may be placed under a scoped object with a property name (e.g., "recs," "rank") that may indicate the relevant domain. The following depicts an example with properties specific to recommendations and ranking.

{
  "id": "142802362487568355801303963103228814096",
  "type": "collection",
  "recs": {
    "sessionId": "58445745-33cf-45cc-801f-353518d8119d"
  },
  "rank": {
    "pinned": true
  }
}

At step 208, the user may interact with a user interface object associated with one of the resources that has a corresponding analytics payload, where the user's interactions may generate specific user device analytics information. When interacting with the user interface, the client device may leave the analytics payload unread and/or untouched, where the client device may refrain from reading and/or modifying the analytics payload. When a user interacts with an object on the user interface (e.g., a rail), information may be needed and/or generated regarding the context of the user interface object to facilitate the interaction. For example, the user may interact with a user interface that displays the user interface object (e.g., the user may interact with the collection by scrolling through a displayed video rail), where context information may correspond to changing the user interface based on the interaction.

In some embodiments, an "ancestry chain" of an object may provide the context information. The server system and/or the client device may construct the ancestry chain. The ancestry chain may include the sequence of objects that may include analytics metadata from the origination point of the user interaction up to the root user experience object. For example, the ancestry chain may uniquely identify the object's position in the user interface hierarchy, as every path may be unique as long as each object in the hierarchy has a unique analytics identifier. The ancestry chain may be constructed based on the following rules. First, ancestors may be ordered from the object nearest to the interaction origination point to the furthest (e.g., closest to the top of the user experience object hierarchy). Second, any object along the way from the interaction origination object to the root that may not include an analytics payload may be omitted. This may ensure that the objects in the hierarchy have an analytics purpose and may ensure that relevant data may be transmitted.

For example, a page rendered on the client device may include a rail titled "Discover Our Collections" on a "Featured" tab of a "Movies" page. The server-to-client response resource may include an analytics payload with the following properties:

{
  "id": "142802362487568355801303963103228814096",
  "type": "collection"
}

Separately, the "Featured" tab collection resource might include an analytics payload with the following properties:

{
  "id": "217740563419683416848972812801165810481 2"
  "type": "collection"
}

The page resource may include an analytics payload with the following properties:

{
  "id": "459581136877657322962328595855531223959 3",
  "type": "page"
}

When the user interacts with the rail on the interface of the client device, the client device may traverse the object hierarchy up from the point of interaction (e.g., the rail) through the root object (e.g., the page), assembling an "ancestry" chain of the analytics payloads encountered along the way. The client device may include the ancestry chain in the analytics payload as client-specific analytics data. In embodiments where there may be a set of analytic payloads, the client device may organize each analytics payload and the one or more resources to reflect an ancestry chain. For example, the ancestry chain may look like the following:

[
  {
    "id": "2177405634196834168489728128011658104812",
    "type": "collection"
  },
  {
    "id": "4595811368776573229623285958555312239593",
    "type": "page"
  }
]

In some embodiments, the full analytics payload associated with a node may be included with the node in the ancestry chain, including any custom properties. For example, as shown below, the page may have a recommendations session ID in the analytics payload:

{
  "id": "4595811368776573229623285958555312239593",
  "type": "page",
  "recs": {
    "sessionId": "cbbafdea-4990-4797-8aca-e8b6f43cc922"
  }
}

If the page has a recommendations session ID in its analytics payload, then the full analytics payload may be included when the page is reference in the ancestry chain, as shown below:

[
  {
    "id": "2177405634196834168489728128011658104812",
    "type": "collection"
  },
  {
    "id": "4595811368776573229623285958555312239593", -continued

```
        "type": "page",
        "recs": {
            "sessionId": "cbbafdea-4990-4797-8aca-e8b6f43cc922"
        }
    }
]
```

At step 210, the client device may send a client event request to a data platform. For example, the client device may trigger the client event request when the user interacts with the user interface object. The data platform may ingest, pre-process, and/or process client events, where the data may be used in business and/or user data. The client event request may include the analytics payload and client-specific analytics data. For example, as described above, the client-specific analytics data may include information only obtainable by the client device (e.g., information impossible for the server system (e.g., server system 115) to know, such as the user's internet connection quality and/or bandwidth). The client-specific analytics data may be transmitted in a strongly-typed section of the instrumentation data that may be separate from the analytics payload. As previously discussed, the client device may pass the analytics payload to the data platform without any manipulation or augmentation of the analytics payload.

At step 212, the data platform may deserialize the analytics payload using the same schema that the content management service used to serialize the analytics payload. The content management service may send the schema to the data platform, where the data platform may deserialize the analytics payload based on the schema. The deserializing may include inputting the schema, analytics payload, and the specific user device analytics information into a machine-learning system and/or a server system to determine user analytics data.

Although FIG. 2 shows example blocks of exemplary method 200, in some implementations, the exemplary method 200 may include additional blocks, fewer blocks, different blocks, or differently arranged blocks than those depicted in FIG. 2 Additionally, or alternatively, two or more of the blocks of the exemplary method 200 may be performed in parallel.

Exemplary Method for a Passthrough Analytics Payload System

FIG. 3 depicts a schematic diagram of an exemplary method 300 for a passthrough analytics payload system, according to one or more embodiments. Notably, method 300 may be performed by one or more processors of a server (e.g., server system 115) that is in communication with one or more user devices (e.g., user device(s) 105) and other external system(s) (e.g., external system(s) 110) via a network (e.g., network 101). However, it should be noted that method 300 may be performed by any one or more of the server, one or more user devices, or other external systems. Exemplary method 300 may be executed on one or more components of FIG. 1 or 4.

The method may include receiving, by a content management module (e.g., content management module 115G) of a server system (e.g., server system 115), a resource request for a page rendering from a user device, wherein the resource request includes one or more resource identifiers (Step 302). As discussed above, the resource request may have been generated based on a received interaction with the interface of the user device (e.g., client device, user device 105). For example, the user device may display one or more user interfaces corresponding to a mobile application. The user may select (e.g., click on) a component of one of the user interfaces, where the selection may trigger a request for a page rendering (e.g., new page). The client device may generate a resource request for one or more resources that correspond to the request. A page rendering may be a resource that has a resource identifier, where the page rendering may include additional resources that have corresponding resources identifiers. For example, the resource identifier may include a page identifier that corresponds to the page rendering, where the page rendering may include additional resources (e.g., a hero gallery at the top of the page rendering, rails of shows, tabs).

The client device may send the resource request to a content management module (e.g., content management service) of a server system. The content management module may store and/or manage data that corresponds to a mobile application. For example, the content management module may include one or more databases (e.g., database(s) 115A) that may store resource identifiers. In some embodiments, the databases may store page data that corresponds to the resource identifier, where the page data may describe a page's design and functionality. The client device may send the resource request for the page rendering to the content management module, where the resource request may include the resource identifier to notify the content management module of the page and corresponding widgets that should be rendered on the user device.

The method may include, in response to receiving the resource request, retrieving and/or computing, by the content management module of the server system, one or more payloads (e.g., one or more analytics payloads) that correspond to the one or more resource identifiers (Step 304). The content management module may query one or more databases, which store page data that may include one or more resources, for page data that corresponds to the resource request. For example, the content management module may query a database based on the page identifier, and in response to the query, the database may send the content management module a response that includes a resource that corresponds to the page identifier.

In one embodiment, the content management module may include one or more data stores (e.g., database(s) 115A) that store one or more analytics payloads. Additionally, or alternatively, the analytics payloads may be constructed on-demand by the server system, where the analytics payloads may have been derived from the data stored in the data stores. Analytics data may be associated with resources when the resources are authored, constructed on-demand from general purpose metadata, or some combination of the two. As discussed above, each analytics payload may include a unique identifier and/or a payload type. The analytics payload may also include an analytic metrics or values computed by the content management module (e.g., a score). For example, in a collection of videos that may be recommended to a user, each video may include a recommendation score in the corresponding analytics payload. The analytics payload may be directed towards a correlation between a recommendation score and/or an engaged video. Additionally, each analytics payload may include an identifier that corresponds to a particular page, where the content management module may use the page identifier to access one or more data stores to find an analytics payload that corresponds to the page. For example, after receiving the resource request, the content management module may analyze the resource request to determine the page identifier. The content management module may then search the analytics payload database and determine an analytics payload that corresponds to the page identifier. Additionally, or alternatively, each analytics payload may include a resource identifier that corresponds to one or more resources (e.g., collections) on a page. For example, an analytics payload may be associated with a collection may include a collection identifier.

The method may include serializing, by the content management module of the server system, the one or more payloads (e.g., one or more analytics payloads) based on one or more schemas (Step 306). The content management module may access a schema data store that may store one or more schemas that correspond to the analytics payload. In some embodiments, the schemas and the analytics payloads may be stored in the same data store. The analytics payload type may correspond to the schema for the particular analytics payload, where the content management module may serialize an analytics payload based on the schema.

In some embodiments, the method may further include analyzing, by the content management module of the server system, the analytics payload to determine the payload type. For example, after retrieving the analytics payload, the content management module may analyze the analytics payload to determine a payload type. The method may further include retrieving, by the content management module of the server system, the schema based on the payload type. For example, the content management module may access a schema database (e.g., database(s) 115A) and search the schema database for a schema that matches the payload type. After retrieving the corresponding schema, the content management module may serialize the analytics payload based on the schema.

The method may include sending, by the content management module of the server system, in response to the resource request, a resource response to the user device, wherein the resource response includes one or more resources and the corresponding one or more payloads (e.g., one or more analytics payloads), and wherein the user device is configured to render the page with the one or more resources on a corresponding interface of the user device (Step 308). The resource response may include one or more resources, where each resource may have a corresponding analytics payload, which may be intended to be passed through to the data platform. For example, after determining the resource(s) and the analytics payload(s), as well as serializing the analytics payload(s), the content management module may send a response to the client device. The resource response may include the resources and the corresponding analytics payload(s). The content management module may send the resource response to the user device, where the user device may render the page and/or user interface elements corresponding to the one or more resources on an interface of the user device. For example, the user device may display a new page that corresponds to the action (e.g., user selection) on the user interface, where the new page is based on the resources in the resource response. In response to the displaying, the user may interact with the displayed new page and/or user interface elements displayed on the user interface. The user's interactions may generate analytics data that is specific for the user device. The user device may refrain from modifying the analytics payload, where the analytics payload is passed through to the data platform.

The method may include receiving, by a data platform (e.g., data platform 115F) of the server system (e.g., server system 115), a request (e.g., an analytics request) from the user device, wherein the request (e.g., analytics request) includes the one or more payloads (e.g., one or more analytics payloads) and resource information (e.g., resource analytics information) (Step 310). The user device may trigger the analytics request, where the user device may send the analytics request to the data platform in response to the user interacting with the user interface. For example, the user may interact with widgets (e.g., user interface elements) displayed on the user interface by clicking on a video, clicking on a show tile, scrolling a collection, scrolling a page, hovering on a tile, long-pressing on a tile, clicking a button on a tile, clicking a button on a collection, and the like. The widgets may have one or more corresponding resources, and the resources may have one or more corresponding analytics payloads. The user interaction may trigger one or more analytics requests, which correspond to the widgets, to be sent to the data platform. The analytics request may include details about the resource and the corresponding analytics payload. The data in the one or more analytics payloads that were sent to the user device is the same as the data in the one or more analytics payloads that were received from the user device. For example, as previously mentioned, the user device may refrain from modifying the analytics payload. The analytics request may include resource analytics information (e.g., specific user device analytics information) that may have been generated based on the user's interactions with the page rendering.

The method may include receiving, by the data platform of the server system, the one or more schemas for the one or more payloads (e.g., one or more analytics payloads) from a schema repository (Step 312). In some circumstances, an analytics payload may conform to a common and well-known schema, and a dedicated schema lookup from a shared schema repository may not be necessary.

In some embodiments, receiving the one or more schemas for the one or more analytics payloads from the schema repository may include analyzing, by the data platform of the server system, each of the one or more analytics payloads to determine the payload type. Receiving the schema may further include sending, by the data platform of the server system, the payload type to the schema repository (e.g., a repository or shared library). After determining the analytics payload type, the data platform may send a schema request to the repository. The schema request may include the analytics payload type. Receiving the schema may further include, in response to the sending, receiving, by the data platform of the server system, the schema from the schema repository. In response to receiving the schema from the schema repository, the data platform may store the schema in one or more data stores.

The method may include deserializing, by the data platform of the server system, the one or more payloads (e.g., one or more analytics payloads) based on the one or more schemas to determine user data (e.g., user analytics data) (Step 314). The user analytics data may include viewership data (e.g., the most popular shows, the most popular movies, minutes watched per session, the number of shows completed), application engagement data (e.g., the most popular rails, the most popular tabs, the most popular hero images), and the like. After receiving the schema from the schema repository, the data platform may deserialize the analytics based on the schema. The deserializing may include inputting the schema, analytics payload, and the specific user device analytics information into a machine-learning system and/or a server system to determine user analytics data. The deserializing may be format-specific. For example, if the payload is a string in a JSON format, the deserialization may include parsing the JSON into a standard object/array representation in the programming language used by the module in the data platform doing the processing. In some embodiments, if the payload is an encrypted string, decryption may be needed before parsing.

The method may include storing, by the data platform of the server system, the user data (e.g., user analytics data) in one or more data stores (Step 316). The user analytics data may be stored for future use and/or reference when analyzing other user analytics data.

In some embodiments, the method may include retrieving, by the server system, the user analytics data from the one or more data stores. The method may further include inputting, by the server system, the user analytics data into one or more machine-learning models. In some embodiments, the machine-learning models may include a machine-learning model that may be separate from the server system and/or a machine-learning model that may belong to another platform, where the platform may interact with the server system. For example, the stored user analytics data, the schema, the analytics payload, and/or the specific user device analytics information may be input into the machine-learning model. The method may further include, in response to the inputting, receiving, by the server system, a page rendering update. For example, in response to the input, the machine-learning model may output an update to the page rendering (e.g., an update regarding the priority that items may be displayed). The method may further include updating, by the server system, the page rendering based on the page rendering update. For example, in some embodiments, the data platform may send the page rendering update and the corresponding page identifier to the content management module. The content management module may then send a page rending update to the client device. For example, the page rendering update may include the updated information (e.g., an updated display order) and the page identifier. Additionally, or alternatively, a machine-learning platform may leverage the data platform to make page optimizations.

Although FIG. 3 shows example blocks of exemplary method 300, in some implementations, the exemplary method 300 may include additional blocks, fewer blocks, different blocks, or differently arranged blocks than those depicted in FIG. 3 Additionally, or alternatively, two or more of the blocks of the exemplary method 300 may be performed in parallel.

Exemplary Computer System

Figure 4:
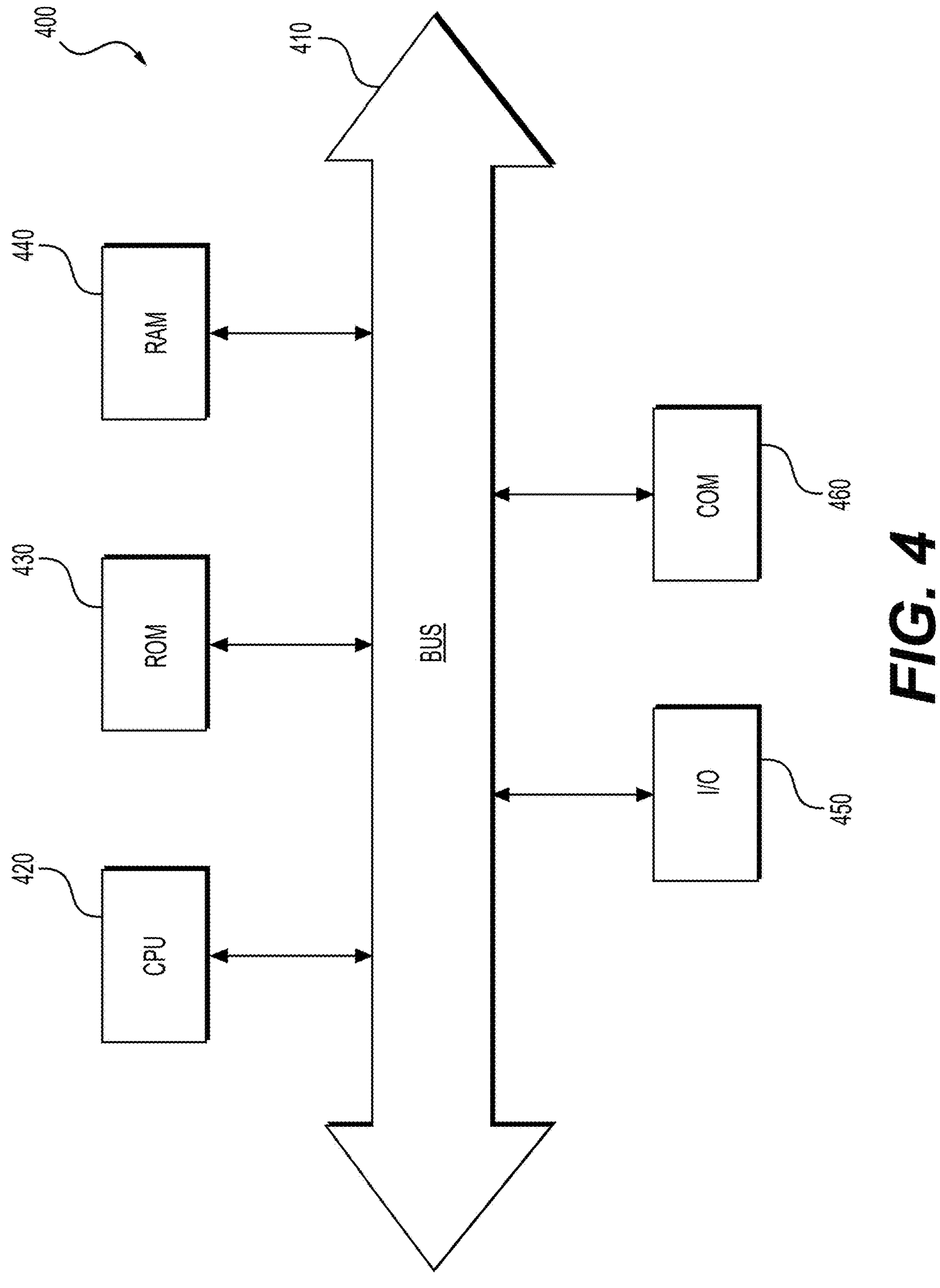
FIG. 4 depicts an example system that may execute techniques presented herein, according to one or more embodiments.

FIG. 4 illustrates a high-level functional block diagram of an exemplary computer system 400, in which embodiments of the present disclosure, or portions thereof, may be implemented, e.g., as computer-readable code. For example, each of the exemplary devices and systems described above with respect to FIG. 4 can be implemented in computer system 400 using hardware, software, firmware, tangible computer readable media having instructions stored thereon, or a combination thereof and may be implemented in one or more computer systems or other processing systems. Hardware, software, or any combination of such may embody any of the modules and components in FIG. 4, as described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-3 may be implemented using computer system 400, shown in FIG. 4. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments, the order of operations may be rearranged without departing from the spirit of the disclosed subject matter.

FIG. 4 provides a functional block diagram illustration of general purpose computer hardware platforms. FIG. 4 illustrates a network or host computer platform 400, as may typically be used to implement a server, such as user device(s) 105, external system(s) 110, and server system 115. It is believed that those skilled in the art are familiar with the structure, programming, and general operation of such computer equipment and, as a result, the drawings should be self-explanatory.

A platform for a server or the like 400, for example, may include a data communication interface for packet data communication 460. The platform may also include a central processing unit (CPU) 420, in the form of one or more processors, for executing program instructions. The platform typically includes an internal communication bus 410, program storage, and data storage for various data files to be processed and/or communicated by the platform such as ROM 430 and RAM 440, although the computer platform 400 often receives programming and data via network communications 470. The hardware elements, operating systems, and programming languages of such equipment are conventional in nature, and it is presumed that those skilled in the art are adequately familiar therewith. The computer platform 400 also may include input and output ports 450 to connect with input and output devices such as keyboards, mice, touchscreens, monitors, displays, etc. Of course, the various computer platform functions may be implemented in a distributed fashion on a number of similar platforms, to distribute the processing load. Alternatively, the computer platforms may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as those used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A computer-implemented method for a passthrough payload system, the computer-implemented method comprising:

receiving, by a content management module of a server system, a resource request for a page rendering from a user device, wherein the resource request includes one or more resource identifiers;

in response to receiving the resource request, retrieving and/or computing, by the content management module of the server system, one or more analytics payloads that correspond to the one or more resource identifiers;

retrieving, by the content management module of the server system, one or more schemas from a schema database based on a payload type for each of the one or more analytics payloads;

serializing, by the content management module of the server system, the one or more analytics payloads based on the retrieved one or more schemas;

sending, by the content management module of the server system, in response to the resource request, a resource response to the user device, wherein the resource response includes one or more resources and the corresponding one or more serialized analytics payloads, and wherein the user device is configured to render the page with the one or more resources on a corresponding interface of the user device, and wherein the one or more schemas are unknown to the user device;

receiving, by a data platform of the server system, a request from the user device, wherein the request includes the one or more serialized analytics payloads and resource information;

receiving, by the data platform of the server system, the one or more schemas for the one or more analytics payloads from a schema repository;

deserializing, by the data platform of the server system, the one or more serialized analytics payloads based on the one or more schemas to determine user data; and storing, by the data platform of the server system, the user data in one or more data stores.

2. The computer-implemented method of claim 1, wherein each of the one or more analytics payloads includes a unique identifier.

3. The computer-implemented method of claim 2, wherein receiving the one or more schemas for the one or more payloads from the schema repository module comprises:

analyzing, by the data platform of the server system, each of the one or more analytics payloads to determine the payload type;

sending, by the data platform of the server system, the payload type to the schema repository; and in response to the sending, receiving, by the data platform of the server system, the schema for each payload type from the schema repository.

4. The computer-implemented method of claim 1, wherein the one or more resource identifiers correspond to a page rendering and one or more corresponding widgets for display on the user device.

5. The computer-implemented method of claim 1, wherein the resource request was generated based on a received interaction with the interface of the user device.

6. The computer-implemented method of claim 1, wherein data in the one or more analytics payloads that were sent to the user device is the same as the data in the one or more analytics payloads that were received from the user device.

7. The computer-implemented method of claim 1, the computer-implemented method further comprising:

retrieving, by the server system, the user data from the one or more data stores;

inputting, by the server system, the user data into one or more machine-learning models;

in response to the inputting, receiving, by the server system, a page rendering update; and updating, by the server system, the page rendering based on the page rendering update.

8. A computer system for a passthrough payload system, the computer system comprising:

a memory having processor-readable instructions stored therein; and one or more processors configured to access the memory and execute the processor-readable instructions, which when executed by the one or more processors configures the one or more processors to perform a plurality of functions, including functions for:

receiving, by a content management module of a server system, a resource request for a page rendering from a user device, wherein the resource request includes one or more resource identifiers;

in response to receiving the resource request, retrieving and/or computing, by the content management module of the server system, one or more analytics payloads that correspond to the one or more resource identifiers;

retrieving, by the content management module of the server system, one or more schemas from a schema database based on a payload type for each of the one or more analytics payloads;

serializing, by the content management module of the server system, the one or more analytics payloads based on the retrieved one or more schemas;

sending, by the content management module of the server system, in response to the resource request, a resource response to the user device, wherein the resource response includes one or more resources and the corresponding one or more serialized analytics payloads, and wherein the user device is configured to render the page with the one or more resources on a corresponding interface of the user device, and wherein the one or more schemas are unknown to the user device;

receiving, by a data platform of the server system, a request from the user device, wherein the request includes the one or more serialized analytics payloads and resource information;

receiving, by the data platform of the server system, the one or more schemas for the one or more analytics payloads from a schema repository;

deserializing, by the data platform of the server system, the one or more serialized analytics payloads based on the one or more schemas to determine user data; and storing, by the data platform of the server system, the user data in one or more data stores.

9. The computer system of claim 8, wherein each of the one or more analytics payloads includes a unique identifier.

10. The computer system of claim 9, wherein receiving the one or more schemas for the one or more payloads from the schema repository:

analyzing, by the data platform of the server system, each of the one or more analytics payloads to determine the payload type;

sending, by the data platform of the server system, the payload type to the schema repository; and in response to the sending, receiving, by the data platform of the server system, the schema for each payload type from the schema repository.

11. The computer system of claim 9, wherein the one or more resource identifiers correspond to a page rendering and one or more corresponding widgets for display on the user device.

12. The computer system of claim 8, wherein the resource request was generated based on a received interaction with the interface of the user device.

13. The computer system of claim 8, wherein data in the one or more analytics payloads that were sent to the user device is the same as the data in the one or more analytics payloads that were received from the user device.

14. The computer system of claim 8, the functions further comprising:

retrieving, by the server system, the user data from the one or more data stores;

inputting, by the server system, the user data into one or more machine-learning models;

in response to the inputting, receiving, by the server system, a page rendering update; and updating, by the server system, the page rendering based on the page rendering update.

15. A non-transitory computer-readable medium containing instructions for a passthrough system, the instructions comprising:

receiving, by a content management module of a server system, a resource request for a page rendering from a user device, wherein the resource request includes one or more resource identifiers;

in response to receiving the resource request, retrieving and/or computing, by the content management module of the server system, one or more analytics payloads that correspond to the one or more resource identifiers;

retrieving, by the content management module of the server system, one or more schemas from a schema database based on a payload type for each of the one or more analytics payloads;

serializing, by the content management module of the server system, the one or more analytics payloads based on the retrieved one or more schemas;

sending, by the content management module of the server system, in response to the resource request, a resource response to the user device, wherein the resource response includes one or more resources and the corresponding one or more serialized analytics payloads, and wherein the user device is configured to render the page with the one or more resources on a corresponding interface of the user device, and wherein the one or more schemas are unknown to the user device;

receiving, by a data platform of the server system, a request from the user device, wherein the request includes the one or more serialized analytics payloads and resource information;

receiving, by the data platform of the server system, the one or more schemas for the one or more analytics payloads from a schema repository;

deserializing, by the data platform of the server system, the one or more serialized analytics payloads based on the one or more schemas to determine user data; and storing, by the data platform of the server system, the user data in one or more data stores.

16. The non-transitory computer-readable medium of claim 15, wherein each of the one or more analytics payloads includes a unique identifier.

17. The non-transitory computer-readable medium of claim 16, wherein receiving the one or more schemas for the one or more payloads from the schema repository comprises:

analyzing, by the data platform of the server system, each of the one or more analytics payloads to determine the payload type;

sending, by the data platform of the server system, the payload type to the schema repository; and in response to the sending, receiving, by the data platform of the server system, the schema for each payload type from the schema repository.

18. The non-transitory computer-readable medium of claim 16, wherein the one or more resource identifiers correspond to a page rendering and one or more corresponding widgets for display on the user device.

19. The non-transitory computer-readable medium of claim 15, wherein the resource request was generated based on a received interaction with the interface of the user device.

20. The non-transitory computer-readable medium of claim 15, wherein data in the one or more analytics payloads that were sent to the user device is the same as the data in the one or more analytics payloads that were received from the user device.

* * * * *